(12) United States Patent  (10) Patent No.: US 7,482,776 B2
Scholich-Tessmann  (45) Date of Patent: Jan. 27, 2009

(54) CONTROLLING RELATIVE MOVEMENT BETWEEN A WORKPIECE AND A TOOL OF A MACHINE TOOL

(75) Inventor: Wolfgang Scholich-Tessmann, Böbllngen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 11/346,604

(22) Filed: Feb. 2, 2006

(65) Prior Publication Data

US 2006/0176002 A1  Aug. 10, 2006

(30) Foreign Application Priority Data

Feb. 4, 2005  (EP) ................................. 05002414

(51) Int. Cl.
*G05B 19/33* (2006.01)
(52) U.S. Cl. .................. 318/575; 219/121.82
(58) Field of Classification Search .......... 318/575; 219/121.82
See application file for complete search history.

(56) References Cited

U.S. PATENT DOCUMENTS

| 4,382,215 | A | * | 5/1983 | Barlow et al. ............. 318/568.1 |
| 5,109,148 | A | * | 4/1992 | Fujita et al. ............. 219/121.82 |
| 5,270,627 | A | * | 12/1993 | Rehse ...................... 318/575 |
| 5,574,348 | A | | 11/1996 | Ehlerding |
| 5,801,939 | A | * | 9/1998 | Okazaki .................. 700/56 |
| 5,917,300 | A | * | 6/1999 | Tanquary et al. ............. 318/575 |
| 6,835,912 | B2 | * | 12/2004 | Leibinger et al. ...... 219/121.67 |
| 6,982,536 | B2 | * | 1/2006 | Geissdorfer et al. ......... 318/632 |
| 2005/0116676 | A1 | * | 6/2005 | Geissdorfer et al. ......... 318/575 |
| 2006/0108961 | A1 | * | 5/2006 | Takemori et al. ............. 318/575 |
| 2006/0186845 | A1 | * | 8/2006 | Terada et al. ................ 318/432 |

FOREIGN PATENT DOCUMENTS

| EP | 0306456 | | 3/1989 |
| EP | 0594699 | | 5/1994 |
| EP | 1366846 | A1 | 12/2003 |

OTHER PUBLICATIONS

Staroselsky et al., "Two-Stage Actuation for Improved Accuracy of Contouring", Proceedings of the 1988 American Control Conference, Jun. 15-17, 1988, pp. 127-132.

* cited by examiner

*Primary Examiner*—Walter Benson
*Assistant Examiner*—Antony M Paul
(74) *Attorney, Agent, or Firm*—Fish & Richardson P.C.

(57) ABSTRACT

Devices and related methods of controlling relative movement between a tool of a machine tool and a work piece including dividing a total desired relative tool to workpiece movement in a direction of an axis into a first movement component and a second movement component; controlling the first movement component with a first closed-loop axis control; determining a resulting movement quantity corresponding to the first movement component; feeding a position error from the first closed-loop axis control to the second closed-loop axis control controlling the second movement component in a closed-loop with the second closed-loop axis control, including adjusting for the position error of the first movement component.

25 Claims, 4 Drawing Sheets

CONTROLLING RELATIVE MOVEMENT BETWEEN A WORKPIECE AND A TOOL OF A MACHINE TOOL

REFERENCE TO RELATED APPLICATIONS

This application claims priority under 35 USC §119(a) from European patent application EP 05 002 414.0, filed Feb. 4, 2005. The complete disclosure of this priority application is incorporated herein by reference.

TECHNICAL FIELD

This disclosure relates to dividing a relative movement between a workpiece and a machine tool in a direction of an axis into at least a first movement component and a second movement component, in which a desired quantity for the total movement is specified.

BACKGROUND

Methods of moving a workpiece relative to a machine tool, and machine tools which are capable of movement relative to a workpiece are know in the art, for example, from EP 0 594 699 B1.

When workpieces are being machined on machine tools, there is the possibility, on the one hand, of moving the workpiece relative to a tool with a suitable drive in order to carry out machining of the workpiece. Alternatively, it is possible to move the tool relative to the workpiece. In some cases, moving the tool relative to the workpiece requires the movement of smaller masses than in the case of moving the workpiece. However, movement of the tool may be subject to limits if, for example, it is attached to a gantry which is moved over the workpiece. Such a gantry can be of a relatively great weight, and therefore the dynamics cannot be too high if there is to be sufficient accuracy. One solution which suggests itself, therefore, is to provide an additional, higher-dynamics drive which acts in the direction of a workpiece drive or a tool drive and which may only have to move very low weights, thereby enabling higher dynamics and greater precision to be achieved. For example, it is possible to provide on a gantry that is displaceable in a Y-direction by one drive a tool holder that is displaceable along the gantry by a relatively shorter distance in the Y-direction by a second drive. A tool held at the tool holder is thereby displaceable in the Y-direction by means of two drives. The first drive, driving the gantry, is frequently referred to as the machine axis and the second, higher-dynamics drive (which drives the tool holder), as the auxiliary axis. A drive that moves the workpiece in an axis direction is frequently referred to as the workpiece axis. The term "axis" is frequently used, therefore, to refer to the drive acting in the axis direction. The auxiliary axis may be a machine axis or a workpiece axis. The open-loop or closed-loop control of two drives acting in the same axis direction may, however, prove difficult.

EP 1 366 846 A1 proposes optimising machining of a workpiece with the aid of a computer program by determining, by reference to the contours to be machined, in the case of a laser cutting machine the contours that are to be cut, whether the gantry or only the tool holder is to be moved. In particular, the gantry can be positioned such that a maximum number of contours may be cut without it being necessary to move the gantry. Therefore, the cutting operation can be carried out solely by the auxiliary axis.

It is known from EP 0 594 699 B1 to supply a device with a control signal by a CNC control. The control signal indicates the required total movement to be executed. The device splits the signal into movement components of the tool support (lower-dynamics axis) and of an additional device (higher-dynamics axis). Apportionment to the two movement axes is performed by an electronic filter, the control signal components for the tool support being produced by a low-pass filter and the control signal components for the additional device being produced by a high-pass filter. Once the control signal has been apportioned, therefore, independent control of the drive of the tool support and the drive of the additional device takes place. The CNC control is supplied with feedback signals describing the total movement in an axis direction.

SUMMARY

According to one aspect, a method of controlling relative movement between a tool of a machine tool and a workpiece includes dividing a total desired relative tool to workpiece movement in a direction of an axis into a first movement component and a second movement component; controlling the first movement component with a first closed-loop axis control; determining a resulting movement quantity corresponding to the first movement component; feeding a position error from the first closed-loop axis control to a second closed-loop axis control, the position error including the difference between the total desired relative tool to workpiece movement and the resulting movement quantity corresponding to the first movement component; and controlling the second movement component in a closed-loop with the second closed-loop axis control, including adjusting for the position error of the first movement component. Therefore, this method allows for closed-loop control of the first and second movement components. The closed-loop control of the first and second movement components are not completely independent of each other. Rather, a value (e.g., the position error) from the first closed-loop axis control is fed to the second closed-loop axis control and is taken into consideration therein for the closed-loop control of the second movement component. The second closed-loop axis control is, as it were, downstream of the first closed-loop axis control. That measure makes it possible to achieve higher dynamics and greater accuracy. The total desired relative tool to workpiece movement can represent a target position, a speed or an acceleration. The total movement can be divided into one or more tool movements and one or more workpiece movements in the same axis direction. It is also possible for one or more machine axes and one auxiliary (machine) axis or one or more workpiece axes and one auxiliary (workpiece) axis to be provided.

In some embodiments, the first closed loop axis control is performed by a first position controller configured to control the first movement component, and the second closed-loop axis control includes a second position controller configured to control the second movement component. In this case, an input quantity for the first position controller can be determined from the total desired relative tool to workpiece movement.

In some cases, a resulting movement quantity corresponding to the second movement component is determined, and a second input quantity for the second position controller is determined from the resulting movement quantity corresponding to the second movement component and a quantity that is proportional to the position error.

In some embodiments, the first closed-loop axis control is configured to control a first axis drive, and the second closed-loop axis control is configured to control a second axis drive.

In this case, controlling the first movement component can include controlling a movement of the first axis drive in the axis direction, and controlling the second movement component can include controlling a movement of the second axis drive in said axis direction.

In some cases, the input quantity for the first position controller of the first closed-loop axis control is the position error in the closed-loop control of the first axis drive. The first axis drive can be, for example, a lower-dynamics axis. The position error can be applied as a position desired value to the second closed-loop axis control. In the second controlled system, the second axis drive (e.g., a higher-dynamics axis) can be adjusted. Thus, the second axis drive (higher-dynamics axis) can adjust the position error of the first axis drive (lower-dynamics axis) accordingly. This can aid in reducing the deviation of the mechanically in-series axes.

Only one desired value for the desired total movement needs to be specified in each case. The division of the movement into the first and second movement component can take place solely in the first and second closed-loop axis controls.

Some implementations may include one or more of the following features. The first and second axis drives, which implement the first and second movement components, can be disposed mechanically in series. A resulting movement quantity corresponding to the total relative movement through the first and second movement components can include the sum of resulting movement quantities of the first and second movement components.

In another aspect, a method of controlling movement between a tool of a machine tool and a workpiece includes: dividing a total desired relative tool to workpiece movement in a direction of an axis into a first movement component and a second movement component; controlling the first movement component with a first closed-loop axis control; and controlling the second movement component with the second closed-loop axis control, including performing a follow-up control of the second movement component.

In some embodiments, the first closed-loop axis control is performed by a position controller configured to control the first movement component, an the second closed-loop axis control is performed by a follow-up controller configured to control the second movement component. In this case, an input quantity for the position controller can be determined from the total desired relative tool to workpiece movement.

In some instances, a resulting movement quantity corresponding to the total relative movement through the first and second movement components of a first movement cycle can be determined. In this case, the input quantity for the position controller can include the difference between the total desired relative tool to workpiece movement and the resulting movement quantity corresponding to the total relative movement through the first and second movement components.

In some embodiments, the first closed-loop axis control is configured to control a first axis drive, and the second closed-loop axis control is configured to control a second axis drive.

In some cases, the first axis drive is configured for higher frequency response than the second axis drive; i.e., the first axis drive is a higher dynamics drive. For example, the first axis drive can be configured to move the tool or workpiece of the machine tool, and the second axis drive (e.g., lower dynamics drive) can be configured to move a gantry of the machine tool.

Some implementations may include one or more of the following features. The total desired relative tool to workpiece movement can be applied solely to the first closed-loop axis control. Therein, an adjusting signal for the first axis drive (e.g., the higher-dynamics axis or higher-dynamics drive) can be determined. In the second closed-loop axis control, a resulting movement quantity corresponding to the higher-dynamics axis can be adjusted in relation to a specifiable value (i.e., the follow-up offset) by generating an adjusting signal for the drive of the second axis drive (e.g., lower-dynamics axis). The follow-up offset is a desired value for the tracking and/or trailing of the auxiliary axis (higher-dynamics axis). Preferably, in the steady state, the auxiliary axis is (on average) in a position corresponding to the follow-up offset.

According to another aspect, a machine tool includes first and second axis drives, each configured to move a tool or a workpiece in respective movement components of a total desired relative tool to workpiece movement along a common axis direction. The machine tool also includes an adjusting system configured to adjust the respective movement components by controlling the second axis drive according to a closed-loop control system (e.g., second closed-loop control) based at least in part on a value provided by another closed-loop control system (e.g., first closed-loop control) controlling the first axis drive. Using such a machine tool, the movements in the direction of an axis can be controlled not only by open-loop control but also by closed-loop control. That results in higher dynamics and greater accuracy. Therefore, a method for apportioning movement components and a machine tool with which greater accuracy and higher dynamics (i.e., higher frequency response) can be achieved in the machining of workpieces.

In some embodiments, higher dynamics are implemented by one axis drive than by the other axis drive. For example, the second axis drive can be configured for higher frequency response than the first axis drive. Small, rapid movements can thereby be executed by the axis drive having the higher dynamics (auxiliary axis). In particular, fine adjustment can be carried out by the axis drive having the higher dynamics (e.g., the second axis drive), whereas coarse adjustment can be carried out by the other axis drive (e.g., the first axis drive). The movements of the first and second axis drives, or rather the movements caused by them, can be superposed on each other.

In certain embodiments, at least one of the first and second closed-loop axis controls has a position controller. With a position controller it is possible to generate an adjusting signal which can be used to activate an axis drive, especially a controlled system comprising the axis drive.

To make closed-loop control possible, measuring devices can be provided for detecting an actual quantity (e.g., resulting movement quantity), for example, the actual position or actual acceleration, of the tool or workpiece. Those actual quantities can be detected for each axis drive, so that, for example, a position value for the position of a drive axis configured to move a gantry of the machine tool, and a position value for the position of another axis drive configured to move the tool or tool holder can be made available.

In some embodiments, the first closed-loop axis control has the position controller and the higher-dynamics axis drive, the second closed-loop axis control has a follow-up controller, and an input quantity of the follow-up controller is determined from the detected resulting movement quantity corresponding to the movement of the first axis drive and a specified follow-up offset value. The lower-dynamics axis drive is able to implement a small control bandwidth (i.e., lower frequency response). The higher-dynamics axis drive (auxiliary axis) is able to implement a larger control bandwidth (i.e., higher frequency response) and hence obtain a greater accuracy. The higher-dynamics axis drive is able to implement movements over only relatively short distances but, in return, more accurate adjustment can be performed. A secondary condition of the closed-loop control preferably provides that the higher-dynamics axis is preferably held in a central position (relative to the tool length or the stroke that can be executed by the tool).

In an alternative embodiment, the first closed-loop axis control has the position controller and the lower-dynamics axis drive, and the second closed-loop axis control has a second position controller. The adjusting system of the alternative embodiment accordingly has exclusively position controllers. A follow-up controller is not provided. The position error in the closed-loop control of the lower-dynamics axis can be applied as a position desired value to the position controller of the higher-dynamics axis.

Preferably, an input quantity of the position controller of the first closed-loop axis control is determined from the total desired relative tool to workpiece movement and the resulting movement quantity corresponding to the first axis drive, and the input quantity of the position controller of the first closed-loop axis control is fed to a determination device for determination of a second input quantity of the position controller of the second closed-loop axis control taking into consideration the resulting movement quantity corresponding to the second axis drive. Preferably, the determination device includes an adaptation device configured to receive the input quantity of the position controller of the first closed-loop axis control.

In the adaptation device, the input quantity of the position controller of the first closed-loop axis control can be modified by an adaptation factor. If the factor is not present (i.e. if it has the value 1), the closed-loop control operates as follows: the lower-dynamics axis (e.g., the first axis drive) is able to comply with the position desired values (i.e., the total desired relative tool to workpiece movement) only to a limited extent. As a result, a position error, or position lag, develops in the lower-dynamics axis.

That position error is fed as the desired value into the closed-loop axis control of the higher-dynamics axis (e.g., the second axis drive). Although that axis is similarly able to comply with its desired values only to a limited extent, it does so distinctly better than the lower-dynamics axis. As a result, the higher-dynamics axis reduces the deviations (position error) of the lower-dynamics axis. Therefore, the higher-dynamics axis can be made to compensate solely for errors of the lower-dynamics axis, including deviations that affect the lower-dynamics axis as a result of interfering forces.

If the coupled axes travel over position ramps at constant desired speed, a constant position error develops in the lower-dynamics axis (e.g., first axis drive) in the settled state. That position error can be completely compensated for by the higher-dynamics axis (e.g., second axis drive) in the settled state, that is to say, the resulting position error of the coupled axes becomes zero in the steady state. A position error of the coupled axes will, however, be produced during settling, which dwindles and proves to be smaller in its amplitude than the steady-state position error of the lower-dynamics axis. Therefore, a desirable closed-loop control behavior can be obtained in the steady state, with a low amplitude oscillation occurring during settling.

If the path behavior of, for example, two Cartesian coordinates, that is to say acting in the X- and Y-direction, is considered, the above-described oscillation in the position error can produce an unfavorable effect on the resulting path movement. The deviations can be greater than when only the lower-dynamics axis is operated on its own, even though the latter's steady-state position deviation is greater than in the case of the coupled axes.

The reason for this is that a settling process of the position deviation of the axes used to generate paths that approximately obeys an e-function produces a very small path error. That holds provided that all the axes involved in the path have identical closed-loop control dynamics. If the settling process deviates from an e-function, a distinctly greater path error can result.

Therefore, the closed-loop control of axes in a path combination can benefit from the following:

substantially identical bandwidths for the axis/axes for each degree of freedom of the path movement; and a settling behavior of the coupled axes when position ramps are being traveled that as far as possible obeys an e-function.

For example, let the Y-axis be of higher dynamics than the X-axis. In that case, it is advisable to improve the X-axis with a further, higher-dynamics axis $X_2$ acting in the X-direction. Preferably, the X and $X_2$ axes together have substantially the same closed-loop control behavior as the Y-axis in order to obtain path errors that are as small as possible.

The adaptation of the dynamics of one axis to the dynamics of another axis is performed by an adaptation factor of the position error of the lower-dynamics axis (the X-axis in the example), which is between zero and one, to the desired value of the higher-dynamics axis (the $X_2$ axis in the example). That factor ensures that the higher-dynamics axis is not able to compensate completely for the position error even in the steady state. When the adaptation factor is set correctly, the coupled axes act substantially identically to the other axis/axes in the path combination (the Y-axis in the example), provided that they have a conventional P-position control. In other words, the adaptation factor adjusts the $X_2$-axis such that the X-axis and the $X_2$-axis together act in the same way as the Y-axis in steady state (i.e., movement at constant velocity).

The adaptation factor adjusts for different control factors in the different axis directions (X, Y). For example, if the position control factor of the $X_2$-axis is $K_{VX2}$, and the position control factor of the Y-axis is $K_{VY}$, then the adaptation factor can be calculated as $A=1-(K_{VX2}/K_{VY})$, where A is the adaptation factor.

The adaptation factor finally reduces the effect of the higher-dynamics axis to the extent required for good path behavior. At the same time, the oscillation in the position deviation of the coupled axes decreases.

The adaptation factor allows the axes to satisfy the above-mentioned requirements for a good path behavior.

If coupled axes are to be used in all the directions of movement (that is to say, for example, in the X-direction and in the Y-direction, the coupled axes then being in the example the X and $X_2$ axis (=auxiliary axis in the X-direction) and the Y and $Y_2$ axis (=auxiliary axis in the Y direction)), optimum parameterisation can be obtained when the adaptation factor is set such that the position error when position ramps are travelled in one direction of movement falls just short of having an overshoot. In this case also, it is necessary to create identical closed-loop control behaviour in the X-direction and the Y-direction, that is to say, the "better" axes must be adapted to the "poorer" axes by way of the described factor.

The details of one or more embodiments of the invention are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
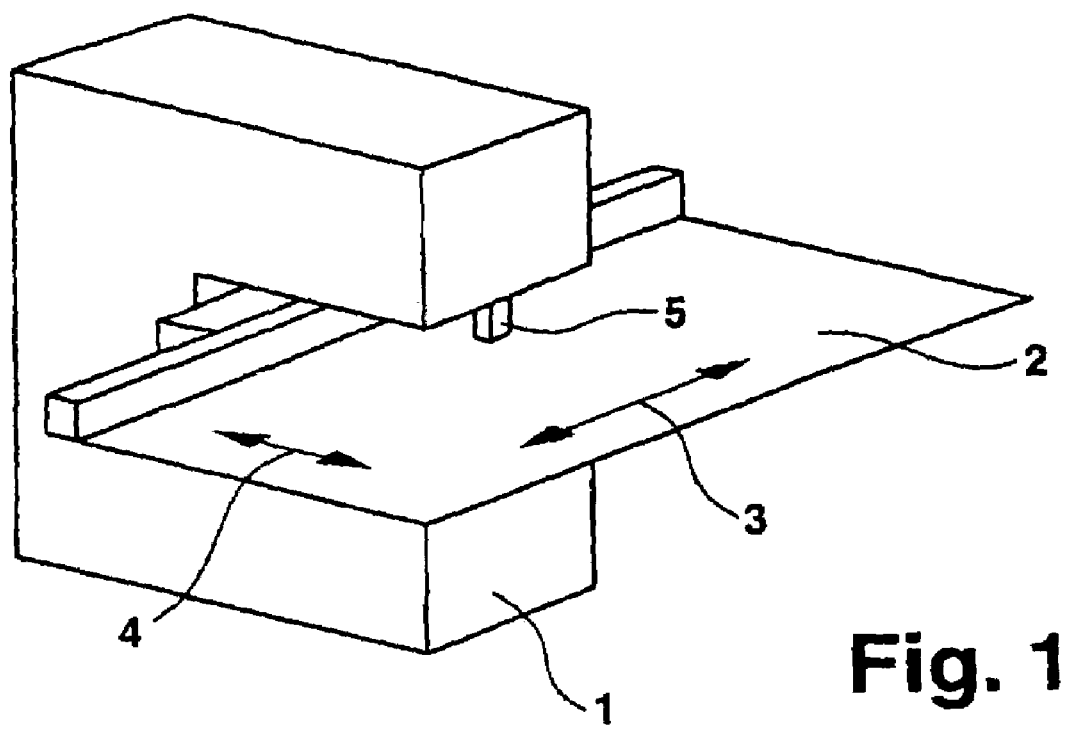
FIG. 1 shows a first machine tool with a workpiece movable in two axis directions.

FIG. 1 shows a machine tool 1 in which a workpiece 2 is movable in the axis directions 3, 4. A tool holder 5, which is capable of receiving a tool not shown, is also movable in axis direction 4. Drives for the workpiece, which act in the axis directions 3, 4, may be referred to as workpiece axes. The drive of the tool holder 5, which acts in axis direction 4, may be referred to as the machine axis.

Figure 2:
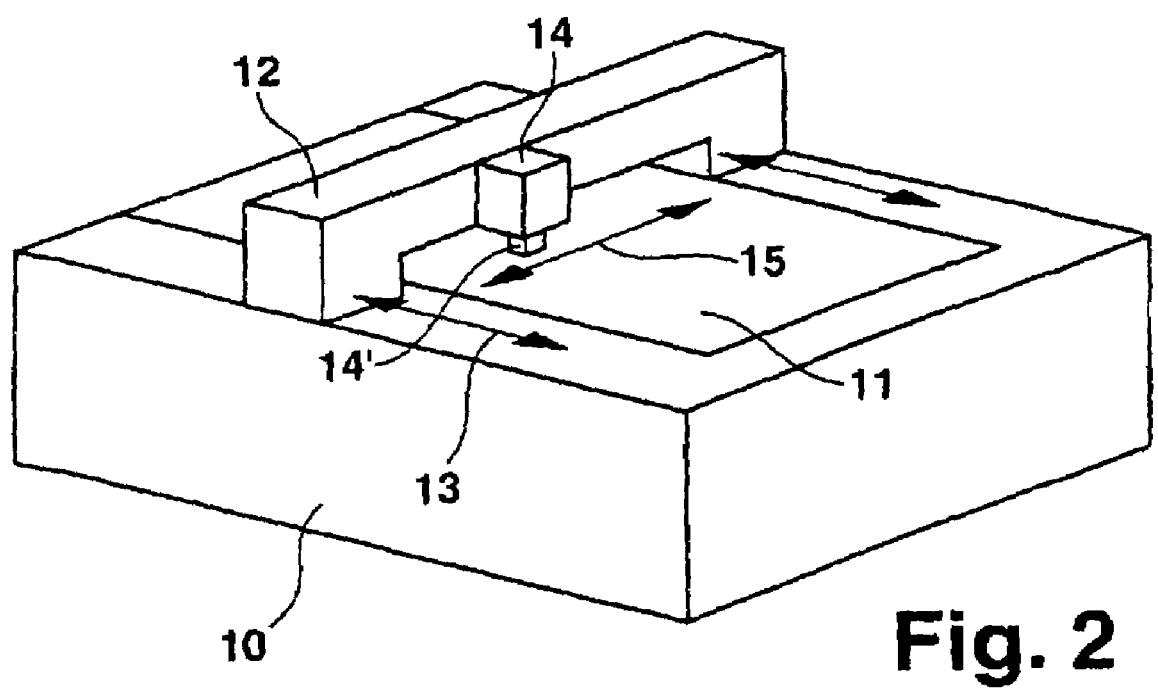
FIG. 2 shows a machine tool with a tool movable in two axis directions.

FIG. 2 shows a further machine tool 10, in which the workpiece 11 is arranged to be stationary. A gantry 12 is movable in the axis direction 13. Arranged on the gantry 12 is a device 14 on which a tool holder 14' capable of holding a tool is in turn arranged. The device 14 (and therewith the tool) is movable in axis direction 15. The tool holder 14' is movable relative to the device 14 in axis direction 13. It will be apparent from FIG. 2 that the device 14 has a lower mass than the gantry 12. Consequently, movements in axis direction 15 can be carried out more rapidly than movements of the gantry in axis direction 13. Highly dynamic movements in axis direction 13 can, however, be executed by the tool holder 14'.

Figure 3:
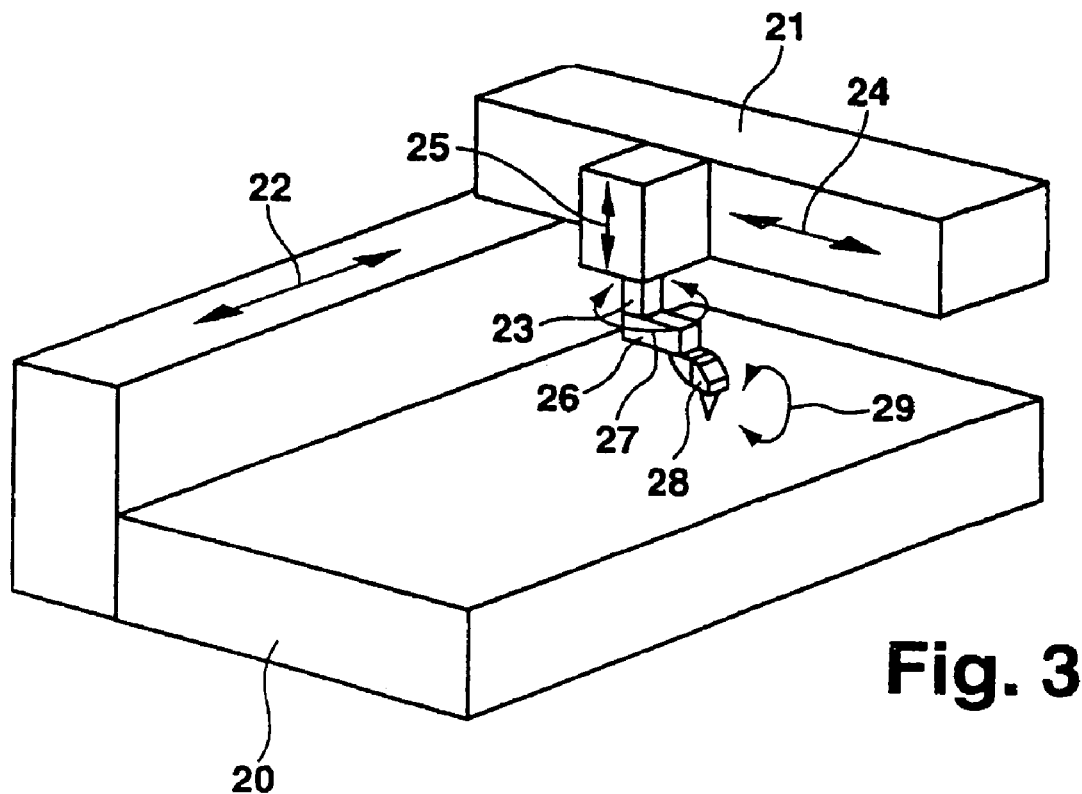
FIG. 3 shows a machine tool with five axis directions.

FIG. 3 shows a machine tool 20 in which an arm 21 is movable in the axis direction 22. A device 23 is movable along the arm 21 in axis direction 24. The device 23 is additionally movable in axis direction 25. The axis directions 22, 24, 25 define the X-, Y-, Z-direction of a Cartesian coordinate system. An extension arm 26 is rotatable in axis direction 27. Arranged on the extension arm 26 is a laser cutting head 28, for example, which in turn is rotatable in axis direction 29.

Figure 4:
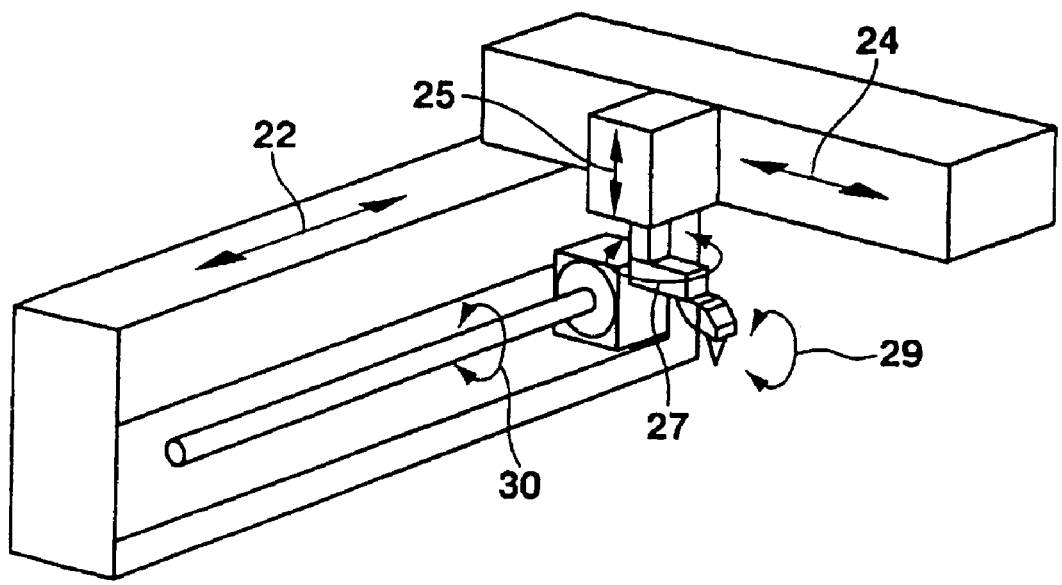
FIG. 4 shows a machine tool with six axis directions.

The illustration in FIG. 4 resembles that in FIG. 3 inasmuch as the same axis directions 22, 24, 25, 27, 29 are provided. In addition, an axis direction 30 is provided, about which a workpiece can be turned.

Figure 5:
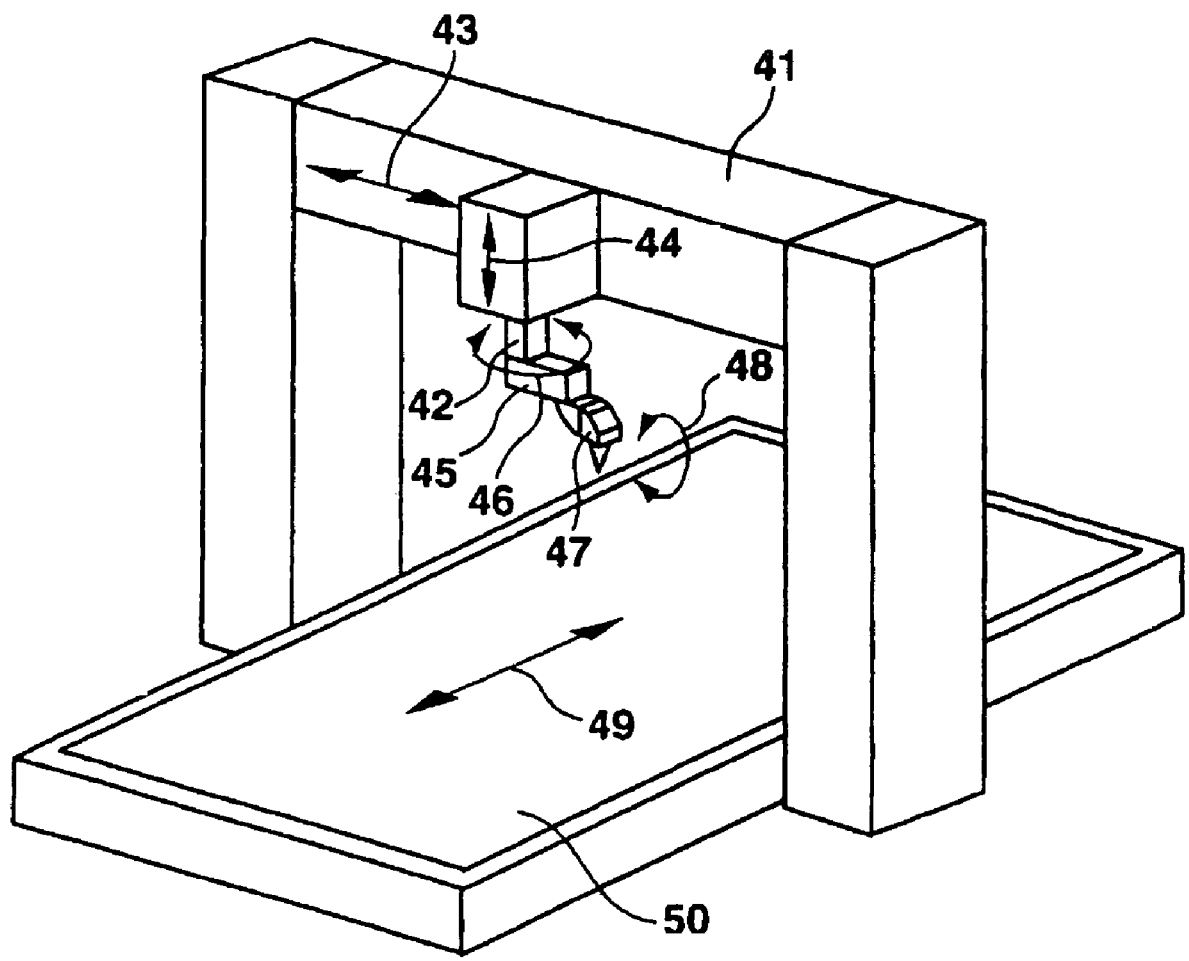
FIG. 5 shows a machine tool with four axis directions and a movable workpiece.

A further embodiment of a machine tool is shown in FIG. 5. A device 42 is movable on a gantry 41 in axis direction 43. The device 42 is in turn vertically displaceable in axis direction 44. The extension arm 45 is rotatable in axis direction 46 and the laser cutting head 47 is rotatable in axis direction 48. Drives acting in the axis directions 43, 44, 46, 48 may be referred to as machine axes, while a drive acting in axis direction 49 may be referred to as a workpiece axis since the workpiece 50 is movable along that axis. In the case of a machine tool, a second displacement can be possible relative to an axis direction. In FIG. 5, this could be achieved by means of the gantry 41 also being movable in axis direction 49.

Figure 6:
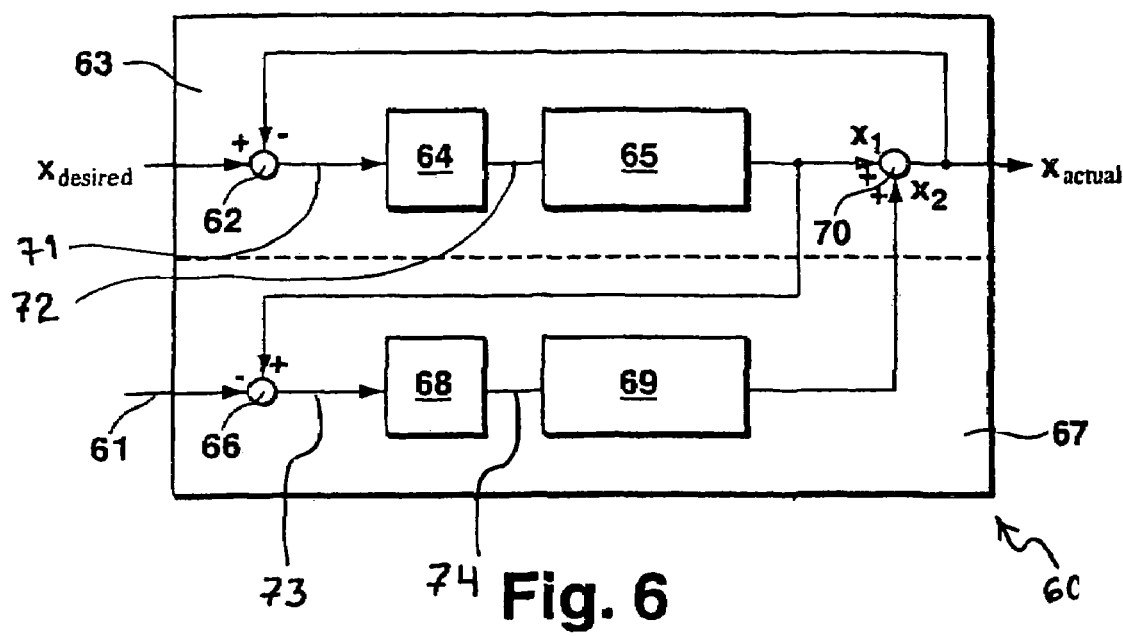
FIG. 6 shows a first embodiment of an adjusting device of a machine tool.

FIG. 6 shows a first embodiment of an adjusting system 60. A desired quantity, $x_{desired}$ is supplied to the adjusting system 60. An actual quantity (e.g., a resulting movement quantity corresponding to a total relative movement through first and second controlled systems 65, 69 of an initial movement cycle) $x_{actual}$ is available as the starting quantity. As a further input quantity, the adjusting system 60 has a follow-up offset at the point 61. An input quantity 71 for a position controller 64 of a first closed-loop axis control 63 is determined from the values $x_{desired}$ and $x_{actual}$ in the comparator 62 of the first closed-loop axis control 63. The position controller 64 determines an adjusting signal 72 for a controlled system 65 comprising a high-dynamics auxiliary axis. The resulting movement quantity adjusted in that manner is determined by a measuring device, not shown, as quantity $x_1$. That quantity is adjusted in relation to the follow-up offset 61 by subtracting the follow-up offset 61 from it in the comparator 66 of the second closed-loop axis control 67 and passing the result as the input quantity 73 to a follow-up controller 68 of the second closed-loop axis control 67. The follow-up controller 68 generates an adjusting signal 74 for one or more machine or workpiece axes arranged in a second controlled system 69. At the output of the second closed-loop axis control 67, an actual quantity $x_2$ is determined. The latter is added to the resulting movement quantity $x_1$ at the point 70, yielding the value $x_{actual}$. It should be noted here that two of the quantities $x_1$, $x_2$, $x_{actual}$ have to be measured or detected and the third quantity can be determined therefrom. The quantities $x_1$, $x_2$, $x_{actual}$ can, for example, be determined by position sensing of the axes or by distance measurement, for example measurement of the distance between workpiece and tool. Such distance measurement is frequently implemented in any case for distance control in a machine tool.

If, for example, the axis position $x_1$ is above the follow-up offset 61, the follow-up controller 68 and the controlled system 69 generate an increasing axis position $x_2$. As a result, the sum of $x_1+x_2$ increases. For that reason, the position controller 64 reduces the axis position $x_1$, since it adjusts the sum $x_1+x_2$ in relation to the desired value $x_{desired}$. In the steady state, the auxiliary axis (higher-dynamics axis) of the first controlled system 65 thus reaches the position specified by the follow-up offset 61.

Figure 7:
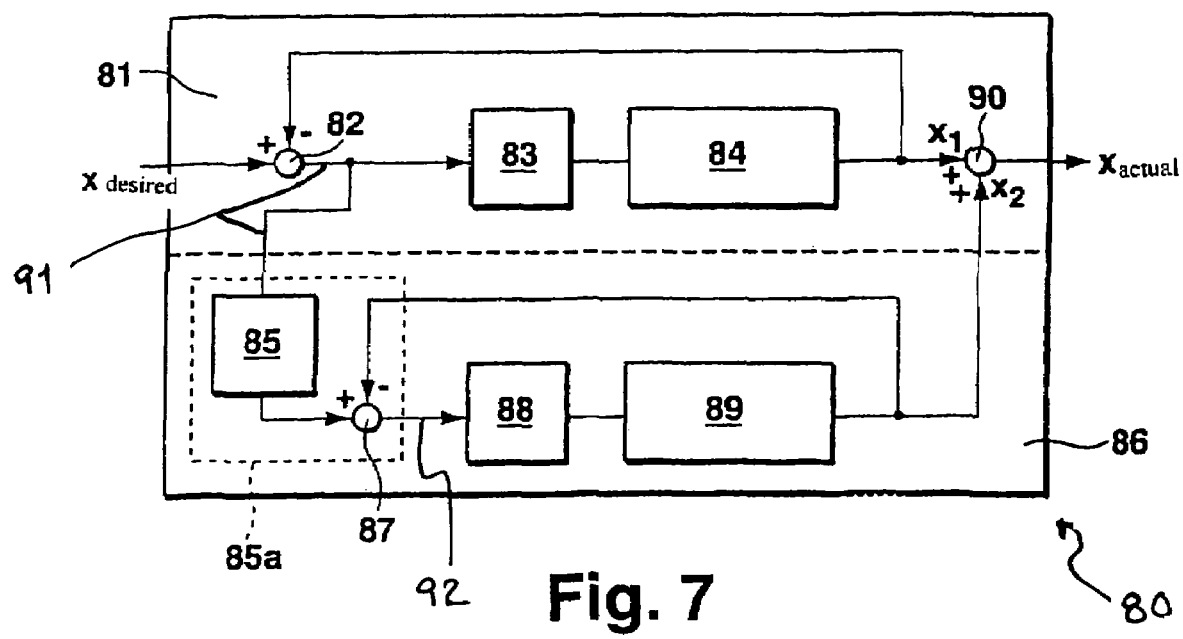
FIG. 7 shows a second embodiment of an adjusting device of a machine tool.

FIG. 7 shows an alternative embodiment of an adjusting system 80. A specified desired value $x_{desired}$ is once again applied to that adjusting system 80. At the output, the actual value $x_{actual}$ (e.g., the resulting movement quantity corresponding to a total relative movement through first and second controlled systems 84, 89 of an initial movement cycle) is available. In contrast to the illustrative embodiment shown in FIG. 6, in the first closed-loop axis control 81 an input quantity 91 for a position controller 83 is determined by subtracting the actual quantity $x_1$ of the first controlled system 84 of the first closed-loop axis control 81 from the desired quantity xdesired in the comparator 82. The first closed-loop axis control 81 includes the position controller 83 which generates an adjusting signal for the controlled system 84 which comprises one or more machine or workpiece axes, in this case of lower dynamics. The input quantity 91 of the position controller 83 corresponds to a position error in the closed-loop control of the axis/axes of the controlled system 84. That position error is passed to an adaptation device 85 which is arranged in a determination device 85a. In the adaptation device 85, the position error can be multiplied by a factor having a value between 0 and 1. If the factor is 1, the position error passes directly into the closed-loop control of the second closed-loop axis control 86 as the desired value. In the comparator 87, the actual quantity $x_2$ at the output of the second controlled system 89 is subtracted from the output of the adaptation device 85. In that manner, the second input quantity 92 of the position controller 88 of the second closed-loop axis control 86 is produced. The position controller 88 determines a control quantity for an auxiliary axis of the controlled system 89, in this case the higher-dynamics axis (i.e., the axis configured for higher frequency response). At the point 90, the actual quantities $x_1$ and $x_2$ are added to obtain the value $x_{actual}$. If the position error of the first closed-loop axis control 81 enters the second closed-loop axis control 86 as the desired value, the position error of the axis/axes of the controlled system 84 is adjusted accordingly by the auxiliary axis of the controlled system 89. This reduces the deviation in the mechanically in-series first and second axes of the controlled systems 84, 89.

A number of embodiments have been described. Nevertheless, it will be understood that various modifications can be made without departing from the spirit and scope of the invention. Accordingly, other embodiments are within the scope of the following claims.

What is claimed is:

1. A method of controlling relative movement between a tool of a machine tool and a work piece, the method comprising:
   dividing a total desired relative tool to workpiece movement in a direction of an axis into a first movement component and a second movement component;
   controlling the first movement component with a first closed-loop axis control performed by a first position controller configured to control the first movement component;
   determining a first resulting movement quantity corresponding to the first movement component;
   feeding a position error from the first closed-loop axis control to a second closed-loop axis control, the position error comprising a difference between the total desired relative tool to workpiece movement and the first resulting movement quantity, wherein the feeding includes adapting the position error before the second closed-loop axis control, thereby generating an adapted quantity being proportional to the position error;
   controlling the second movement component with the second closed-loop axis control performed by a second position controller configured to control the second movement component, wherein controlling the second movement component includes adjusting for the position error of the first closed-loop axis control;
   determining a second resulting movement quantity corresponding to the second movement component; and
   determining a second input quantity for the second position controller by subtracting the second resulting movement quantity from the adapted quantity.

2. The method according to claim 1, wherein feeding the position error from the first closed-loop axis control to the second closed-loop axis control comprises feeding the position error from the first closed-loop axis control to a determination device, and
   wherein the determination device is configured to determine the second input quantity for the second position controller based on the adapted quantity.

3. The method according to claim 2, wherein the determination device includes an adaptation device configured to determine the adapted quantity that is proportional to the position error.

4. The method according to claim 1, wherein the first closed-loop axis control is configured to control a first axis drive, and the second closed loop-axis drive is configured to control a second axis drive, and wherein
   controlling the first movement component comprises controlling a movement of the first axis drive in the axis direction; and
   controlling the second movement component comprises controlling a movement of the second axis drive in said axis direction.

5. The method according to claim 4, wherein the second axis drive is configured for higher frequency response than the first axis drive.

6. The method according to claim 4, wherein the machine tool comprises a gantry configured to move the tool relative to the workpiece, and
   wherein controlling the movement of the first axis drive comprises moving the gantry, and controlling the movement of the second axis drive comprises moving the tool or workpiece with respect to the gantry.

7. The method of claim 1, wherein the adapted quantity is determined outside of the first closed-loop axis control and the second first closed-loop axis control.

8. A method of controlling relative movement between a tool of a machine tool and a workpiece, the method comprising:
   dividing a total desired relative tool to workpiece movement in a direction of an axis into a first movement component and a second movement component;
   controlling the first movement component with a first closed-loop axis control performed by a position controller configured to control the first movement component;
   feeding a value from the first closed-loop axis control to a second closed-loop axis control;
   controlling the second movement component with the second closed-loop axis control, wherein controlling the second movement component includes performing a follow-up control of the second movement component using a follow-up controller configured to control the second movement component;
   determining an actual quantity comprising a resulting movement quantity corresponding to the total relative movement through the first and second movement components of a first movement cycle; and
   determining an input quantity for the position controller, the input quantity comprising the difference between the total desired relative tool to workpiece movement and the actual quantity.

9. The method according to claim 8, wherein the first closed-loop axis control is configured to control a first axis drive, and the second closed-loop axis control is configured to control a second axis drive, and wherein
   controlling the first movement component comprises controlling a movement of the first axis drive in the axis direction; and
   controlling the second movement component comprises controlling a movement of the second axis drive in said axis direction.

10. The method according to claim 9, wherein the first axis drive is configured for higher frequency response than the second axis drive.

11. The method of claim 9, wherein the machine tool comprises a gantry configured to move the tool relative to the workpiece, and
   wherein controlling the movement of the first axis drive comprises moving the tool or workpiece, and controlling the movement of the second axis drive comprises moving the gantry with respect to the tool or workpiece.

12. The method according to claim 11, further comprising determining a second input quantity for the follow-up controller from the value from the first closed-loop axis control.

13. The method according to claim 12, further comprising specifying a follow-up offset value to the second closed-loop axis control wherein the second input quantity comprises the difference between the specified follow-up offset value and the value from the first closed-loop axis control.

14. A machine tool comprising:
first and second axis drives each configured to move a tool or a work piece in respective movement components of a total desired relative tool to workpiece movement along a common axis direction; and
an adjusting system configured to adjust the respective movement components by controlling the second axis drive according to a closed-loop control based on an adapted position error of the first axis drive, the adjusting system comprising:
  a determination device configured to
    multiply the position error of the first axis drive by a factor having a value between 0 and 1, thereby generating the adapted position error that is proportional to the position error, wherein the position error comprises the difference between the total desired relative tool to workpiece movement and a resulting movement quantity corresponding to the movement of the first axis drive, and
    determine an input quantity for the closed loop control from the adapted position error and a resulting movement quantity corresponding to the movement of the second axis drive; and
  a position controller configured to receive the input quantity from the determination device and control the second axis drive based at least in part on the input quantity from the determination device.

15. The machine tool according to claim 14, wherein the second axis drive is configured for higher frequency response than the first axis drive.

16. The machine tool according to claim 14, further comprising another position controller configured to control the first axis drive.

17. The machine tool according to claim 14, further comprising:
a first measuring device configured to detect the resulting movement quantity corresponding to the movement of the first axis drive; and
a second measuring device configured to detect a resulting movement quantity corresponding to the movement of the second axis drive.

18. The machine tool according to claim 14, further comprising a third axis drive configured to move the tool or the workpiece along a second axis direction that is different from the common axis direction.

19. The machine tool according to claim 18, wherein the determination device comprises an adaptation device configured to adapt the position error of the first axis drive such that a combined steady state behavior of the first and second axis drives is substantially equal to a steady state behavior of the third axis drive.

20. The machine tool of claim 14, wherein the adapted position error is generated outside the closed-loop control.

21. A machine tool comprising:
first and second axis drives each configured to move a tool or a work piece in respective movement components of a total desired relative tool to workpiece movement along a common axis direction;
a third axis drive configured to move the tool or the workpiece along a second axis direction; and
an adjusting system configured to adjust the respective movement components by controlling the second axis drive according to a closed-loop control based on an adapted position error that is proportional to a position error, wherein the position error comprises the difference between the total desired relative tool to workpiece movement and a resulting movement quantity corresponding to the movement of the first axis drive, the adjusting system comprising:
  a determination device configured to determine an input quantity from the adapted position error and a resulting movement quantity corresponding to the movement of the second axis drive; and
  a position controller configured to receive the input quantity from the determination device and control the second axis drive based at least in part on the input quantity from the determination device,
wherein the determination device comprises an adaptation device configured to generate the adapted position error by adapting the position error of the first axis drive, such that a combined steady state behavior of the first and second axis drives is substantially equal to a steady state behavior of the third axis drive.

22. The machine tool according to claim 21, wherein the adaptation device is configured to multiply the position error of the first axis drive by a factor to produce an adaptation device output quantity, further wherein the input quantity to the position controller of the second axis drive defines a difference between the adaptation device output quantity and the resulting movement quantity corresponding to the movement of the second axis drive.

23. The machine tool according to claim 21, wherein the second axis drive is configured for higher frequency response than the first axis drive.

24. The machine tool according to claim 21, further comprising another position controller configured to control the first axis drive.

25. The machine tool according to claim 21, further comprising:
a first measuring device configured to detect the resulting movement quantity corresponding to the movement of the first axis drive; and
a second measuring device configured to detect a resulting movement quantity corresponding to the movement of the second axis drive.

* * * * *

UNITED STATES PATENT AND TRADEMARK OFFICE
CERTIFICATE OF CORRECTION

PATENT NO. : 7,482,776 B2
APPLICATION NO. : 11/346604
DATED : January 27, 2009
INVENTOR(S) : Wolfgang Scholich-Tessmann Page 1 of 1

It is certified that error appears in the above-identified patent and that said Letters Patent is hereby corrected as shown below:

On the front page, the Inventor's address is listed "BöblIngen" - please replace it with --Böblingen--.

At column 9, line 60, in claim 4, delete "closed loop-axis" and insert --closed-loop axis--.

At column 10, line 13, in claim 7, after "second" delete "first".

At column 10, line 65, in claim 13, after "control" insert --;--.

At column 10, lines 65-67, in claim 13, after "control" delete "wherein the ....... axis control." and insert the same on column 10, line 66 as a new line.

At column 11, line 20, in claim 14, delete "closed loop" and insert --closed-loop--, therefor.

Signed and Sealed this

Fourteenth Day of July, 2009

JOHN DOLL
*Acting Director of the United States Patent and Trademark Office*